(12) United States Patent
Adams et al.

(10) Patent No.: US 10,402,095 B1
(45) Date of Patent: Sep. 3, 2019

(54) ONLINE DATA EXPANSION IN REDUNDANT DATA STORAGE SYSTEMS

(71) Applicant: EMC IP HOLDING COMPANY LLC, Hopkinton, MA (US)

(72) Inventors: Ian Adams, Cambridge, MA (US); Kevin C. Heasley, Apple Valley, CA (US); Deepak Vokaliga, Hopkinton, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 15/966,298

(22) Filed: Apr. 30, 2018

(51) Int. Cl.
   *G06F 3/06* (2006.01)
(52) U.S. Cl.
   CPC .......... *G06F 3/0607* (2013.01); *G06F 3/065* (2013.01); *G06F 3/067* (2013.01); *G06F 3/0644* (2013.01)
(58) Field of Classification Search
   CPC ...... G06F 3/0607; G06F 3/0644; G06F 3/065; G06F 3/06; G06F 3/067; G06F 3/0611; G06F 3/0631; G06F 3/0665; G06F 3/0685; G06F 3/0647; G06F 3/0604; G06F 3/0605; G06F 3/0649; G06F 3/0617; G06F 3/0689
   USPC ................................................. 711/162, 644
   See application file for complete search history.

(56) References Cited

U.S. PATENT DOCUMENTS

| | | | |
|---|---|---|---|
| 7,805,582 B2 * | 9/2010 | Yim ...................... | G06F 8/4441 711/105 |
| 8,819,362 B1 * | 8/2014 | Duprey ............... | G06F 11/2069 711/161 |
| 8,838,887 B1 * | 9/2014 | Burke ................... | G06F 3/0611 711/112 |
| 8,918,562 B1 * | 12/2014 | McLamb ................ | H04L 43/10 377/39 |
| 8,996,827 B1 * | 3/2015 | Natanzon .............. | G06F 12/063 711/162 |
| 9,477,407 B1 * | 10/2016 | Marshak ................. | G06F 3/061 |
| 9,507,887 B1 * | 11/2016 | Wang ................... | G06F 17/5009 |
| 9,575,668 B1 * | 2/2017 | Martin ................ | G06F 12/0246 |

(Continued)

*Primary Examiner* — Mano Padmanabhan
*Assistant Examiner* — Jean C Edouard
(74) *Attorney, Agent, or Firm* — Krishnendu Gupta; Jason Reyes; Anne-Marie Dinius

(57) ABSTRACT

The system, devices, and methods disclosed herein relate to online data expansion in disaster recovery enabled data storage systems. We disclose embodiments that allow storage devices, which are coupled to one another in a disaster recovery, data replication-type scenario, to perform storage expansion in most cases without having to disable remote replication during the expansion. The teachings of this patent application facilitate methods of expansion for data storage device pairings where the data storage devices are the same size or where the primary storage device is smaller than the secondary storage device. In both of these situations, expansion occurs without disabling disaster recovery. In the situation where the secondary storage device is larger than the primary device, expansion is allowed, with the caveat that disaster recovery must be disabled briefly. Moreover, in situations where remote replication is lost or disabled, it is possible to expand a primary or secondary storage device independently, and then to enable expansion of whichever device was not expanded once remote replication is reactivated.

20 Claims, 6 Drawing Sheets

(56) References Cited

U.S. PATENT DOCUMENTS

| | | | |
|---|---|---|---|
| 2008/0229048 A1* | 9/2008 | Murase | G06F 3/0607 711/171 |
| 2012/0042141 A1* | 2/2012 | Tatara | G06F 3/0607 711/162 |
| 2013/0024616 A1* | 1/2013 | Kawaguchi | G06F 3/0605 711/114 |
| 2014/0156956 A1* | 6/2014 | Ezra | G06F 3/065 711/162 |
| 2016/0320980 A1* | 11/2016 | Fang | G06F 3/0611 |

* cited by examiner

ONLINE DATA EXPANSION IN REDUNDANT DATA STORAGE SYSTEMS

FIELD OF THE INVENTION

This disclosure is related to the field of redundant data storage systems and, more particularly, to systems and methods for automating data expansion capabilities therein.

BACKGROUND

Organizations around the globe need IT infrastructures that can deliver instant access to the huge volumes of data intrinsic to traditional transaction processing/data warehousing and to a new generation of applications built around the world of social, mobile, cloud, and big data. One exemplary architecture can be found at Dell EMC, where we are redefining Data Center Cloud Platforms to build the bridge between these two worlds to form the next generation Hybrid Cloud. Essential to this is the ability to quickly and efficiently allocate storage resources. While we discuss Dell EMC products by way of background, the teachings of this application are universally applicable to other similar platforms currently existing or designed in the future.

VMAX3® and VMAX All Flash® arrays are pre-configured in the factory with Virtual Provisioning Pools from which thin devices can be quickly and easily assigned to hosts and applications. FIG. 1 is a block diagram of an exemplary VMAX3 system, while FIG. 2 is an exemplary block diagram of a VMAX All-Flash system. In both systems, physical drives in the array are placed in Storage Resource Pools (SRPs), which provide the physical storage for thin devices that are presented to hosts using masking views. Storage Resource Pools are managed by Fully Automated Storage Tiering (FAST) and require no configuration operations to be performed by the storage administrator. This simplifies the initial configuration of new VMAX3 and VMAX All Flash arrays significantly and greatly reduces the time to I/O. Storage capacity is monitored at the SRP level and RAID considerations and thin device binding are no longer issues of concern for the storage administrator when creating and assigning devices. This is because all devices are available as soon as they are created, and RAID protection is a function of the SRP itself and not a property of an individual device. This new array design and method of configuring and allocating storage greatly reduces the amount of time and effort required to manage and monitor the VMAX3 and VMAX All Flash array.

Storage Resource Pools are comprised of one or more data pools, which contain the pre-configured data (or TDAT) devices that provide storage for the thin devices (TDEVS), which are created and presented to hosts or applications. Physical storage for the TDAT devices is provided by disk groups, which contain physical drives. In order to understand SRPs and the role they play in the configuration and management of the VMAX3 and VMAX All Flash, it is important to understand these elements, which are the underlying entities that comprise SRPs.

Data Pools.

A data pool, also known as a thin pool, is a collection of data devices of the same emulation and RAID protection type. All data devices configured in a single disk group are contained in a single data pool. As such, all the data devices are configured on drives of the same technology type, capacity, and, if applicable, rotational speed. Currently, the VMAX3 and VMAX All Flash storage arrays support up to 510 data pools. Data pools are preconfigured within the storage array and their configuration cannot be modified using management software.

Disk Groups.

A disk group is a collection of physical drives sharing the same physical and performance characteristics. Drives are grouped based on technology, rotational speed, capacity, and desired RAID protection type. Each disk group is automatically configured with data devices (TDATs) upon creation. A data device is an internal logical device dedicated to providing physical storage, which is used by thin devices. All data devices in the disk group are of a single RAID protection type and, typically, all are the same size. Because of this, each drive in the group has the same number of hyper-volumes (hypers) created on them, with each hyper being the same size. There are 16 hypers configured on each drive. Currently, the VMAX3 and VMAX All Flash storage arrays support up to 510 internal disk groups. Disk groups are preconfigured within the storage array and their configuration cannot be modified using management software. Dell EMC Customer Service may add physical drives to a disk group, but drives cannot be removed.

Storage Resource Pools.

A Storage Resource Pool (SRP) is a collection of disk groups configured into thin data pools constituting a FAST domain whose performance and reliability is tightly coupled. This means that data movement performed by FAST is done within the boundaries of the SRP. Application data belonging to thin devices can be distributed across all data pools within the SRP to which it is associated. TimeFinder snapshot data and SRDF/A DSE (delta set extension) data are also written to pools within an SRP. By default, the VMAX3 and VMAX All Flash storage arrays have a single SRP containing all the configured data pools. This single SRP configuration is appropriate for the vast majority of production environments.

There is no restriction on the combination of drive technology types and RAID protection within an SRP. When moving data between data pools, FAST will differentiate the performance capabilities of the pools based on both rotational speed (if applicable) and RAID protection. While an SRP may contain multiple data pools, individual data pools can only be a part of one storage resource pool.

VMAX3 and VMAX All Flash radically simplify storage provisioning by eliminating the need to manually assign physical storage resources to hosts and applications. Instead, the storage performance required for an application is specified during the provisioning process by associating a pre-defined service level objective to the application through the storage group containing its thin devices. Application data is then dynamically allocated by FAST across storage resources of differing performance characteristics to achieve the overall performance required by the application. This ability to provision to service levels is inherently available on all VMAX3 and VMAX All Flash storage arrays because all arrays are virtually provisioned with FAST permanently enabled.

Virtual Provisioning.

Virtual Provisioning allows an increase in capacity utilization by enabling more storage to be presented to a host than is physically consumed and by allocating storage only as needed from a shared virtual pool. Virtual Provisioning also simplifies storage management by making data layout easier through automated wide striping and by reducing the steps required to accommodate application growth. Virtual Provisioning uses a type of host-accessible device called a virtually provisioned device, also known as a thin device (TDEV), which does not need to have physical storage allocated at the time the devices are created and presented to a host. All thin devices are associated with the default SRP upon creation. The physical storage that is used to supply storage capacity to thin devices comes from data (TDAT) devices within an SRP. These data devices are dedicated to the purpose of providing the actual physical storage used by virtually provisioned devices.

When data is written to a portion of the virtually provisioned device, the VMAX3 and VMAX All Flash array allocates physical storage from the pool and maps that storage to a region of the virtually provisioned device including the area targeted by the write. These allocation operations are performed in small units of storage called virtually provisioned device extents, which are one (1) track. In current implementations, a track can be either 128 KB or 64 KB in a VMAX3 or VMAX All Flash embodiment. In alternate, non-mainframe embodiments, track sized can vary. These extents are also referred to as chunks. When data is read from a virtually provisioned device, the data being read is retrieved from the appropriate data device in the storage resource pool where the data was written. When more storage is required to service existing or future virtually provisioned devices, data devices can be added to existing data pools within the SRP.

Storage Groups.

A storage group is a logical collection of VMAX thin devices that are to be managed together, typically constituting a single application. Storage groups can be associated with a storage resource pool, a service level objective, or both. Associating a storage group with an SRP defines the physical storage to which data in the storage group can be allocated. The association of a service level objective defines the response time objective for that data. By default, storage groups will be associated with the default storage resource pool and managed under the Optimized SLO. A storage group is considered "FAST managed" when it has an explicit SLO or SRP assigned to it.

When a storage group is a parent storage group with an associated child group, the SLO or SRP are associated with the child group. Parent storage groups cannot have SLO or SRPs associated with them. Devices may be included in more than one storage group, but may only be included in one storage group that is FAST managed. This ensures that a single device cannot be managed by more than one service level objective or have data allocated in more than one storage resource pool. Individual thin devices cannot have an SLO or SRP assigned to them.

Currently, the VMAX3 and VMAX All Flash storage array supports up to 16,384 storage groups, each of which may contain up to 4,096 devices. In future embodiments, this storage capacity will likely grow.

VMAX3 and VMAX All Flash Service Level Objectives.

A service level objective (SLO) defines an expected average response time target for a storage group. By associating a service level objective to a storage group that contains devices from an application, FAST automatically monitors the performance of the application and adjusts the distribution of extent allocations within a storage resource pool in order to maintain or meet the response time target. The actual response time of an application associated with each service level objective will vary based on the observed workload and will depend on average IO size, read/write ratio, the use of local or remote replication, along with the availability of other resources within the array. A detailed description of the available service level objectives is available in FAST and VMAX3 and VMAX All Flash documentation available at support.emc.com.

Configurations with a Single SRP.

The default VMAX3 and VMAX All Flash system configuration contains a single storage resource pool. For the majority of environments, a single SRP system will be the best configuration for both performance and ease of management. One advantage of a single SRP system is the simplicity with which storage creation, allocation, and management can be performed. This ease of use inherent in the VMAX3 and VMAX All Flash, which was one of the main goals in the design of the arrays, is most easily recognized and experienced with a single SRP configuration. With a single SRP and devices under FAST control, the storage administrator can simply create the required devices and add them to a storage group with the appropriate Service Level Objective. Once that is done, the physical location of the data is determined by FAST, requiring no further management by the storage administrator to ensure optimal availability and performance. Both mainframe, and open systems can be configured in a single SRP, either sharing physical disk groups or with isolated disk groups for each emulation type.

Configurations with Multiple SRPs.

While the vast majority of environments will benefit from a single SRP configuration, there are certain user, regulatory, or business requirements that can best be met with multiple SRPs. Multiple SRP systems offer some benefits over single SRP systems for specific use cases. Multiple SRP systems may be considered in multi-tenant situations where isolation of workload or dedicated physical drives is required. This segregation may be desired to prevent a tenant, who shares a single SRP with other tenants, from assigning high performing SLOs for multiple applications thereby potentially causing the performance to decline for others who share the SRP. Multiple SRPs allow the physical disks to be isolated. If a configuration is large enough such that a single SRP will exceed the maximum recommended disk group size, multiple SRPs may be needed.

Configurations requiring SRPs with an unusually large amount of capacity may simply be the result of a large production environment, or they may be related to other things such as particular local replication requirements. For example, physical separation between clone source devices and clone targets may be required in certain circumstances, such as when the space needed by clone targets is large enough that the number of devices required in a single SRP would violate the maximum recommended SRP size. This type of configuration will also protect against certain user errors, such as an administrator accidentally oversubscribing the source SRP, leaving the target pool without the required space to create clone targets.

The need to segregate drives or data to adhere to legal requirements is a common and valid reason why multiple SRP array configurations may be adopted. Though things like DAEs, power, and engines are often shared within the array, physical drives can be segregated to meet government or industry mandated physical data separation. Spindle isolation may also be required for performance reasons. Depending on the particular configuration, extreme performance requirements may require separate SRPs. For example, a VMAX3 configuration may be designed using a small number of flash drives with the remaining physical drives being 10 k or 15 k RPM with RAID1 protection in order to satisfy extreme performance requirements. A multiple SRP environment may also be warranted with certain operating systems because of similar high performance needs. For example, SRPs for use with IBM i (formerly AS/400) may be designed in this way to isolate disk resources from what is being used by other operating systems attached to the array.

Disadvantages of a Multiple SRP System.

While multiple SRP systems are sometimes necessary, they do also have some attendant disadvantages. Firstly, application data cannot span multiple SRPs, which forces the storage administrator to be concerned with choosing an appropriate SRP for each application. Performance planning must be done on each individual SRP in a multiple SRP system instead of on only a single SRP that encompasses the entire array. This means that the administrator must plan ahead of time for any possible I/O bursts and for the maximum required performance for each application based on the SRP that it will be assigned to. This is much more time-consuming for the administrator than it would be to simply assign an SLO to a storage group in a single SRP system and let FAST handle any required moves to relocate busy extents onto a higher performing storage tier.

Secondly, with more than one SRP, FAST optimization is limited because FAST can only make performance-based extent moves within an SRP, not between them. This means that if storage tiering is going to be used within an array, each SRP must have multiple storage tiers if the data within each SRP is to be managed by FAST. This is not the most efficient or cost-effective way to manage a VMAX3 and VMAX All Flash array. Smaller SRPs can also be an issue in and of themselves. This is because SRPs containing lower spindle counts can potentially lead to reduced performance unless they are large enough for the data to be spread widely enough across the physical drives that comprise the disk group.

Another disadvantage for the storage administrator is the need to monitor and manage available capacity in multiple SRPs. Having a multiple SRP system with the same capacity as a single SRP system increases the possibility of running out of space in a given SRP because each SRP will contain a smaller amount of capacity leaving a greater chance that an SRP may not have enough free space to satisfy extent allocation for new or existing volumes. Multiple SRP configurations will also require more physical drives than similarly sized configurations using a single SRP. This is because adequate spares will be required in each SRP to properly protect against physical drive failure. This holds true for all drive types in each SRP including flash drives. This can be a significant additional expense depending on the configuration of the SRPs and how many disk groups exist in each.

Regardless of the reason for configuring them, in addition to the above disadvantages, multiple SRP systems result in additional management complexity over single SRP systems, at least in the area of capacity allocation, capacity management, and performance. For example, it is not currently possible to use online data expansion technologies when SRP systems have remote replication features. Remote replication is typically enabled in systems where data redundancy is essential, for example in disaster recovery scenarios where data storage providers must retain redundant copies of data. In the current art, in order to accomplish online data expansion, remote replication must be disabled during the expansion process.

The problem with disabling remote replication arises from the fact that the primary and back-up or secondary storage drives or pools can lose synchronization. In other words, the system loses its disaster recovery capabilities throughout the time it takes to copy the newly added tracks from the primary storage device to the secondary or back-up storage device. If there is a disaster that occurs during this timeframe, redundant data could be lost. It is therefore desirable to allow data drive expansion without affecting remote replication or disaster recovery capabilities.

SUMMARY

The following Summary and the Abstract set forth at the end of this application are provided herein to introduce some concepts discussed in the Detailed Description below. The Summary and Abstract sections are not comprehensive and are not intended to delineate the scope of protectable subject matter that is set forth by the claims presented below. All examples and features mentioned below can be combined in any technically possible way.

The system, devices, and methods disclosed herein relate to online data expansion in disaster recovery enabled data storage systems. We disclose embodiments that allow storage devices, which are coupled to one another in a disaster recovery, data replication-type scenario, to perform storage expansion in most cases without having to disable remote replication during the expansion. The teachings of this patent application facilitate methods of expansion for data storage device pairings where the data storage devices are the same size or where the primary storage device is smaller than the secondary storage device. In both of these situations, expansion occurs without disabling disaster recovery. In the situation where the secondary storage device is larger than the primary device, expansion is allowed, with the caveat that disaster recovery must be disabled briefly.

Embodiments herein could be used in conjunction with Symmetrix® Remote Data Facility (SRDF) software and architectural configurations supporting SRDF and SRDF-like implementations. In some embodiments, we discuss a data storage system having a single primary data storage device and a secondary data storage device. Those of skill in the art will recognize that the teaching herein could be equally applicable to scenarios having a single primary data storage device and multiple secondary storage devices. Alternate embodiments could employ multiple primary storage devices and a single secondary storage device. Additionally, connections between the various storage devices could be synchronous, asynchronous, or a combination thereof.

In some embodiments, we disclose, for a data storage system including a memory and at least a primary thin storage device and a secondary thin storage device, the storage devices being logically divided, either explicitly or implicitly, into a plurality of tracks, wherein the primary and secondary storage devices are communicatively coupled using a remote replication communication protocol, a method comprising determining a last written point on the primary thin storage device by setting the last written point to a last physical cylinder and a last physical head location of the primary thin storage device; comparing a capacity of the primary thin storage device to a capacity of the secondary thin storage device; determining a last written point for the secondary thin storage device based on the comparison of the capacity of the primary thin storage device to the capacity of the secondary thin storage device; determining a first unwritten point for the primary thin storage device using the last written point for the primary thin storage device; determining a first unwritten point for the secondary thin storage device using the last written point for the secondary thin storage device; adding a plurality of additional storage tracks to the primary thin storage device or the secondary thin storage device; and determining if any of the additional storage tracks should be set as an invalid track by comparing a value of the first unwritten point for the primary thin storage device to a value for the first unwritten point for the secondary thin storage device.

A track is invalid if it is not known to have the correct data. In embodiments, an invalid track could occur in either a primary or a secondary device. Both primary and secondary devices can self-determine when they have an invalid track. This is referred to as a "local invalid." In addition, a primary device can determine when a secondary device has an invalid track, and vice versa. This is referred to as a "remote invalid."

In alternate embodiments, we disclose a system comprising a primary thin storage device; a secondary thin storage device, the thin storage devices being logically divided, either explicitly or implicitly, into a plurality of tracks, wherein the primary and secondary thin storage devices are communicatively coupled using a remote replication communication protocol; one or more processors; one or more remote data facility (RDF) adapters; a memory comprising code stored thereon that, when executed, performs a method comprising: determining a last written point on the primary thin storage device by setting the last written point to a last physical cylinder and a last physical head location of the primary thin storage device; comparing a capacity of the primary thin storage device to a capacity of the secondary thin storage device; determining a last written point for the secondary thin storage device based on the comparison of the capacity of the primary thin storage device to the capacity of the secondary thin storage device; determining a first unwritten point for the primary thin storage device using the last written point for the primary thin storage device; determining a first unwritten point for the secondary thin storage device using the last written point for the secondary thin storage device; adding a plurality of additional storage tracks to the primary thin storage device or the secondary thin storage device; and determining if any of the additional storage tracks should be set as an invalid track by comparing a value of the first unwritten point for the primary thin storage device to a value for the first unwritten point for the secondary thin storage device.

In yet an alternate embodiment, we disclose a computer program product to expand data storage capacity, the computer program product being embodied in a tangible, non-transitory computer readable storage medium and comprising computer instructions for: determining a last written point on the primary thin storage device by setting the last written point to a last physical cylinder and a last physical head location of the primary thin storage device; comparing a capacity of the primary thin storage device to a capacity of the secondary thin storage device; determining a last written point for the secondary thin storage device based on the comparison of the capacity of the primary thin storage device to the capacity of the secondary thin storage device; determining a first unwritten point for the primary thin storage device using the last written point for the primary thin storage device; determining a first unwritten point for the secondary thin storage device using the last written point for the secondary thin storage device; adding a plurality of additional storage tracks to the primary thin storage device or the secondary thin storage device; and determining if any of the additional storage tracks should be set as an invalid track by comparing a value of the first unwritten point for the primary thin storage device to a value for the first unwritten point for the secondary thin storage device.

In a further embodiment, it is possible to suspend the remote replication relationship between a primary and secondary storage device and to allow hosts to write directly to a secondary storage device, as opposed to data arriving at a secondary storage device from a primary storage device. In this embodiment, the secondary storage device can be expanded independent of expanding the primary storage devices. In this embodiment, the secondary storage device's last written point could be determined as previously described with respect to the determining the last written point for the primary storage device. If the secondary storage device is the same size as the primary storage device, there would be no change in establishing the last written point on the secondary storage device. If, however, the secondary storage device has a greater capacity than the primary storage device, its last written point would increase. In this embodiment, when remote replication resumes, the secondary storage device's last written point would not decrease. Therefore, when the primary storage device's storage capacity expands, the newly expanded tracks could be marked as invalid.

BRIEF DESCRIPTION OF THE DRAWINGS

Objects, features, and advantages of embodiments disclosed herein may be better understood by referring to the following description in conjunction with the accompanying drawings. The drawings are not meant to limit the scope of the claims included herewith. For clarity, not every element may be labeled in every figure. The drawings are not necessarily to scale, emphasis instead being placed upon illustrating embodiments, principles, and concepts. Thus, features and advantages of the present disclosure will become more apparent from the following detailed description of exemplary embodiments thereof taken in conjunction with the accompanying drawings in which:

DETAILED DESCRIPTION

Figure 1:
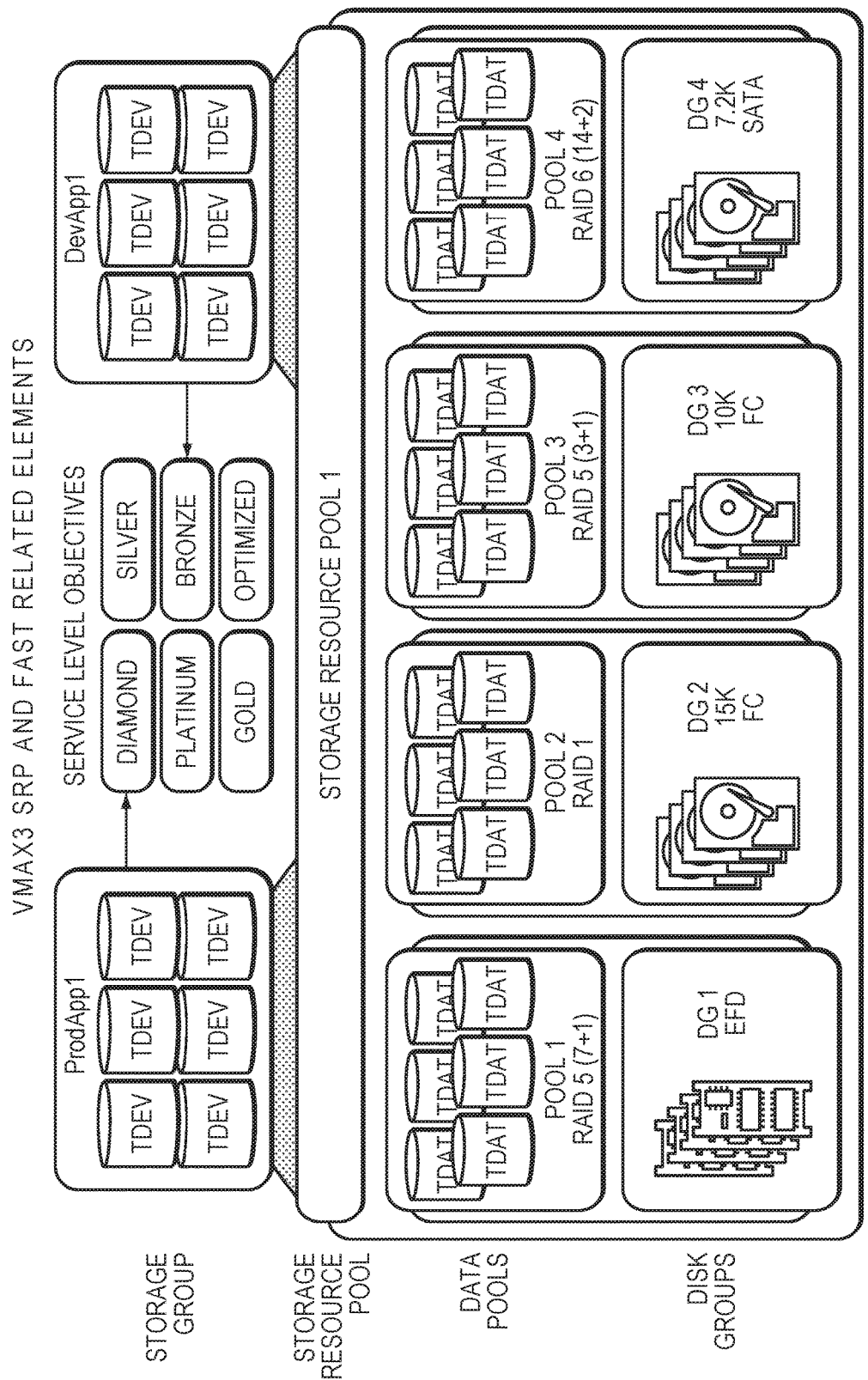
FIG. 1 is a block diagram illustrating an example of a data storage system, in this case a VMAX 3, according to embodiments of the system described herein.
Figure 2:
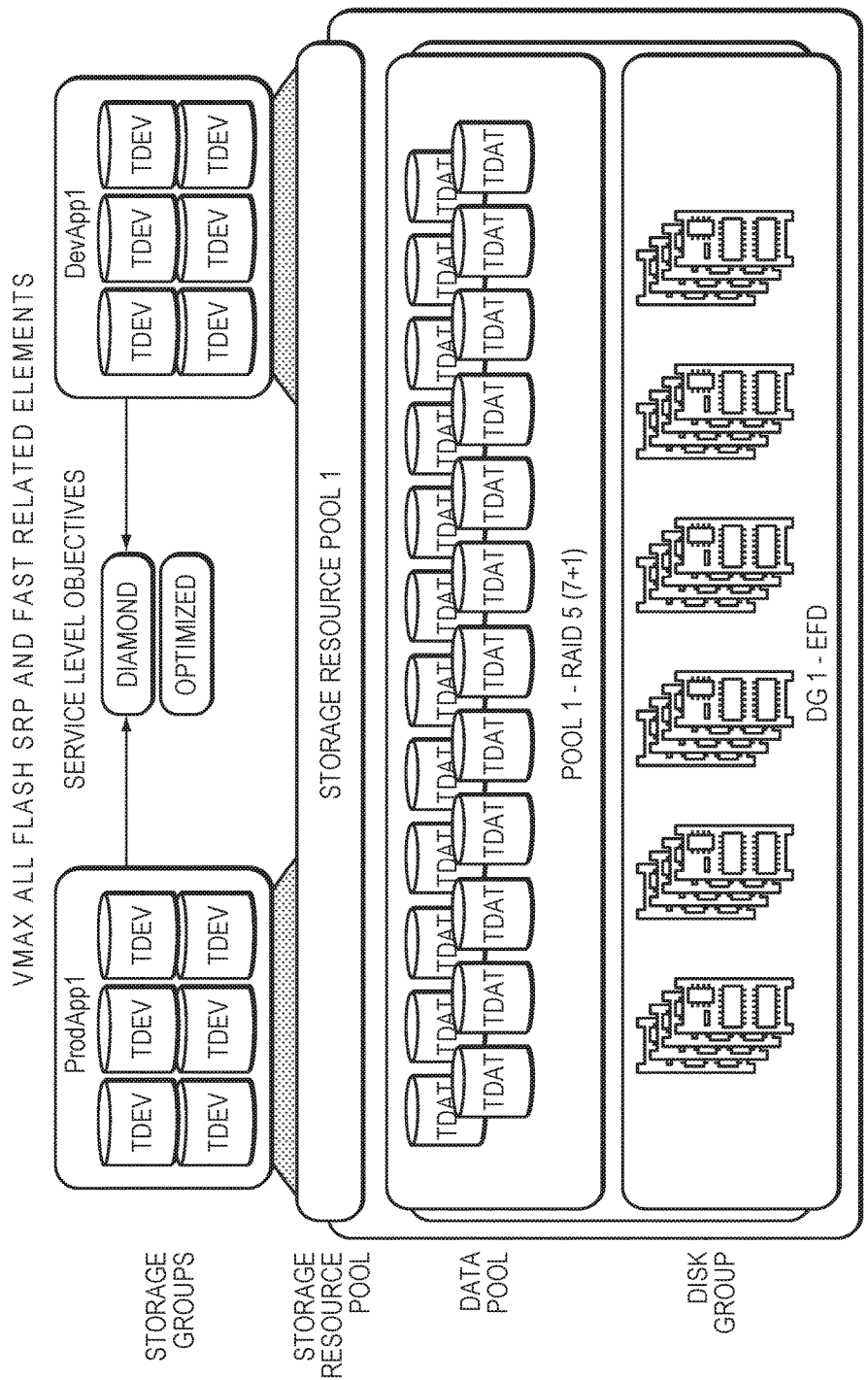
FIG. 2 is a block diagram illustrating an example of a data storage system according to embodiments of the system described herein.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.]

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Referring now to the figures of the drawings, the figures comprise a part of this specification and illustrate exemplary embodiments of the described system. It is to be understood that in some instances various aspects of the system may be shown schematically or may be shown exaggerated or altered to facilitate an understanding of the system. Additionally, method steps disclosed herein can be performed within a processor, a memory, a computer product having computer code loaded thereon, and the like.

Of note, the terms "track," "cylinder" and "head" were originally derived in the context of mainframe computing. These historical terms continue to be used today in non-mainframe computing although the physical tracks, cylinders, and heads are no longer present in non-mainframe computing. For a historic perspective on the use of these terms, see http://www.askthezoslady.com/cchhr-and-eav/, a portion of which is quoted below. The embodiments and claims disclosed herein can be used in mainframe and non-mainframe computing.

Background regarding "track," "cylinder," and "head"— "Since a computer system can have multiple disks accessible, each disk unit has its own unit address relative to the system. Each unit address is required to be unique. This is sort of like disks attached to a PC being assigned unique letters like C, D, E, F, and so on; except the mainframe can have a lot more disks attached, and it uses multi-character addresses expressed as hex numbers rather than using letters of the alphabet. That hex number is called the unit address of the disk." See http://www.askthezoslady.com/cchhr-and-eav/

"Addresses on the disk volume itself are mapped in three-dimensional space. The position of each record on any disk is identified by Cylinder, Head, and Record number, similar to X, Y, and Z co-ordinates, except that they're called CC, HH, and R instead of X, Y, and Z. A track on disk is a circle. A cylinder is a set of 15 tracks that are positioned as if stacked on top of each other. You can see how 15 circles stacked up would form a cylinder, right? Hence the name cylinder." See http://www.askthezoslady.com/cchhr-and-eav/

"Head, in this context, equates to Track. The physical mechanism that reads and writes data is called a read/write head, and there are 15 read/write heads for each disk, one head for each possible track within a cylinder. All fifteen heads move together, rather like the tines of a 15-pronged fork being moved back and forth. To access tracks in a different cylinder, the heads move in or out to position to that other cylinder. So just 15 read/write heads can read and write data on all the cylinders just by moving back and forth." Id.

"That's the model, anyway. And that's how the original disks were actually constructed. Now the hardware implementation varies, and any given disk might not look at all like the model. A disk today could be a bunch of PC flash drives rigged up to emulate the model of a traditional disk. But Regardless of what any actual disk might look like physically now, the original disk model was the basis of the design for the method of addressing data records on disk. In the model, a disk is composed of a large number of concentric cylinders, with each cylinder being composed of 15 individual tracks, and each track containing some number of records." Id.

"Record here means physical record, what we normally call a block of data (as in block size). A physical record—a block—is usually composed of multiple logical records (logical records are what we normally think of as records conceptually and in everyday speech). But a logical record is not a real physical thing, it is just an imaginary construct implemented in software. If you have a physical record—a block—of 800 bytes of data, your program can treat that as if it consists of ten 80-byte records, but you can just as easily treat it as five 160-byte records if you prefer, or one 800-byte record; the logical record has no real physical existence. All reading and writing is done with blocks of data, aka physical records. The position of any given block of data is identified by its CCHHR, that is, its cylinder, head, and record number (where head means track, and record means physical record)." Id.

"The smallest size a data set can be is one track. A track is never shared between multiple data sets." Id. Of note, for non-mainframe embodiments, a block is synonymous with a track.

Figure 3:
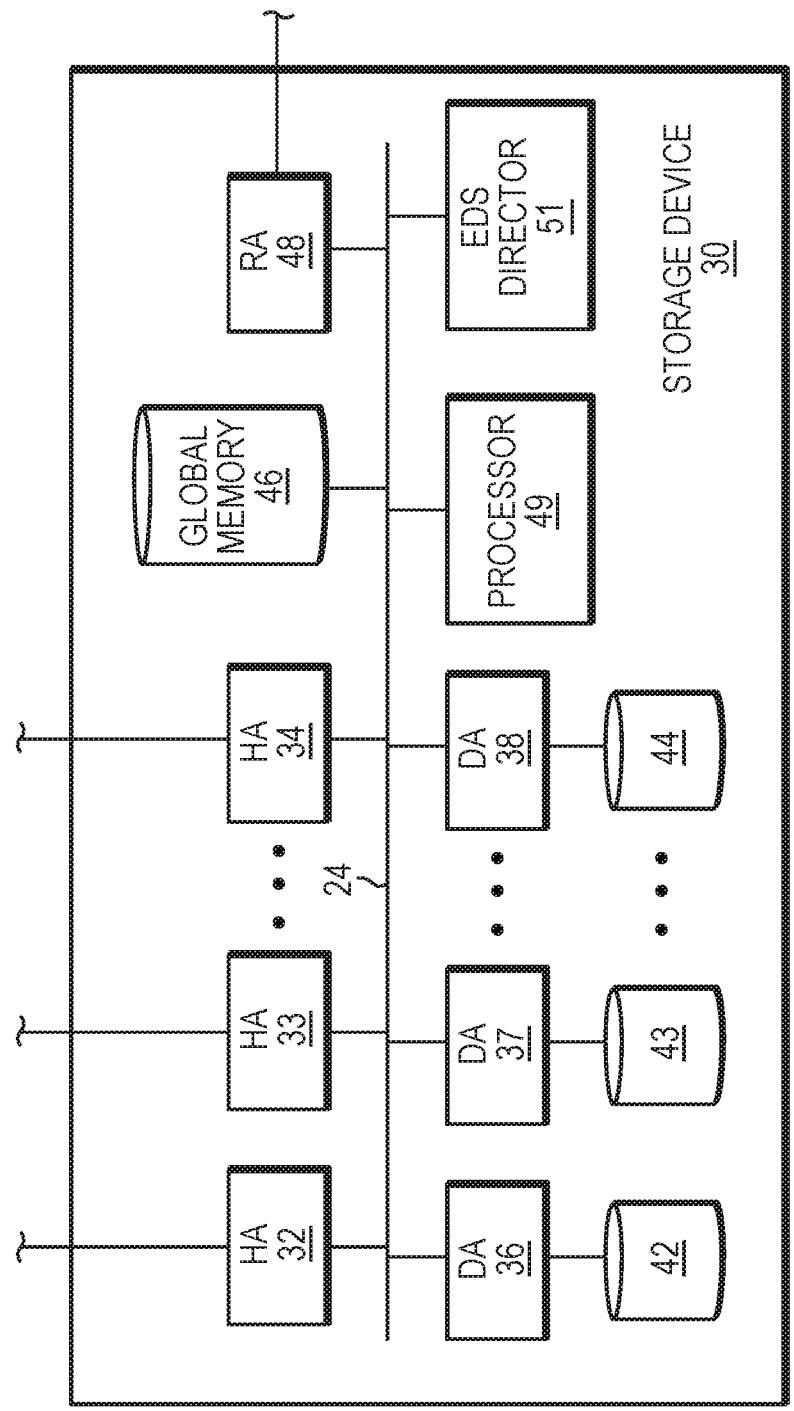
FIG. 3 is a schematic of an exemplary data storage system according to embodiments herein.

FIG. 3 is a schematic illustration showing a storage device 30 that includes a plurality of host adapters (HA) 32-34, a plurality of disk adapters (DA) 36-38 and a plurality of disk drives 42-44. The disk drives 42-44 should be understood as representing any appropriate type of storage media, including, without limitation, DRAM cache, flash or other solid-state storage device, tape, optical media, and/or any combination of permanent, semi-permanent and temporarily-limited storage media. Each of the disk drives 42-44 is coupled to a corresponding one of the DA's 36-38. Although FIG. 3 shows a one-to-one correspondence between the DA's 36-38 and the disk drives 36-38, it should be understood that it is possible to couple more than one disk drive to a DA and/or to couple more than one DA to a disk drive. Moreover, one or more DA 36-38 may be used to communicate with one or more other storage devices (not shown) that could either be the same type of storage device as the storage device 30 or could be a different type of storage device.

The storage device 30 also includes a global memory 46 that may be accessed by the HA's 32-34 and the DA's 36-38. The storage device 30 also includes an RDF adapter (RA) 48 that may also access the global memory 46 and a processor 49. The processor 49 could be located within the storage device 30, or external to the storage device 30. The RA 48 may communicate with one or more additional remote storage devices (not shown) and/or one or more other remote devices (not shown) via a data link (not shown).

In addition, the storage device can include an Enginuity Data Service ("EDS") director 51, which in essence provides a translation layer between TDEV 71-74 and TDAT 61-67 locations. That is, the EDS director translates or correlates a track location on TDEV 71-74 to a track location on TDAT 61-67.

In some embodiments, there could be three items—TDEV's 71-74, TDAT's 61-67 and Physical Disk (or Flash), not shown. TDEV's 71-74 are virtualized device that we present to the Host. HA's 32-34 and RA's 48 work with TDEV's 71-74. TDAT's 61-67 are virtualized devices that can be presented to the DA 36-38. We then have the physical disk (or Flash) that maps to TDAT 61-67. For every allocated track in the system 30, we have Front End (TDEV) 71-74 Device/Cylinder/Head and that same track is mapped to a back end TDAT 61-67 (Device/Cylinder/Head). If it is a Null track (not allocated) we do not have any TDAT 61-67 or Physical Disk backing it.

EDS directors 51 work on both TDEV's 71-74 and TDAT's 61-67 and they access both the Device/Cylinder/Head of TDEV's 71-74 and TDAT's 61-67. When a new TDEV 71-74 track needs to be allocated, the HA 32-34/RA 48 asks EDS director 51 to do this. At that point, EDS director 51 will tie the Device/Cylinder/Head of the TDEV 71-74 to a Device/Cylinder/Head of a TDAT 61-67 picking from a Physical disk (or Flash).

The HA's 32-34, the DA's 36-38, the global memory 46, the RA 48, the EDS director 51, and an internal processor in some embodiments may be coupled to a bus 24 that is provided to facilitate communication therebetween. In various embodiments, additional RA's 48 and processors 49 may be incorporated into the storage device 30.

Each of the HA's 32-34 may be coupled to one or more host computers (not shown) that access the storage device 30. The host computers (hosts) access data on the disk drives 42-44 through the HA's 32-34 and the DA's 36-38. The global memory 46 contains a cache memory that holds tracks of data read from and/or to be written to the disk drives 42-44 as well as storage for tables that may be accessed by the HA's 32-34, the DA's 36-38, and the RA 48. Note that, for the discussion herein, an extent of data is described as being a track or tracks of data. However, it will be appreciated by one of ordinary skill in the art that the system described herein may work with any appropriate incremental amount, or section, of data, including possibly variable incremental amounts of data and/or fixed incremental amounts of data and/or logical representations of data, including (but not limited to) compressed data, encrypted data, or pointers into de-duplicated data dictionaries.

Figure 4:
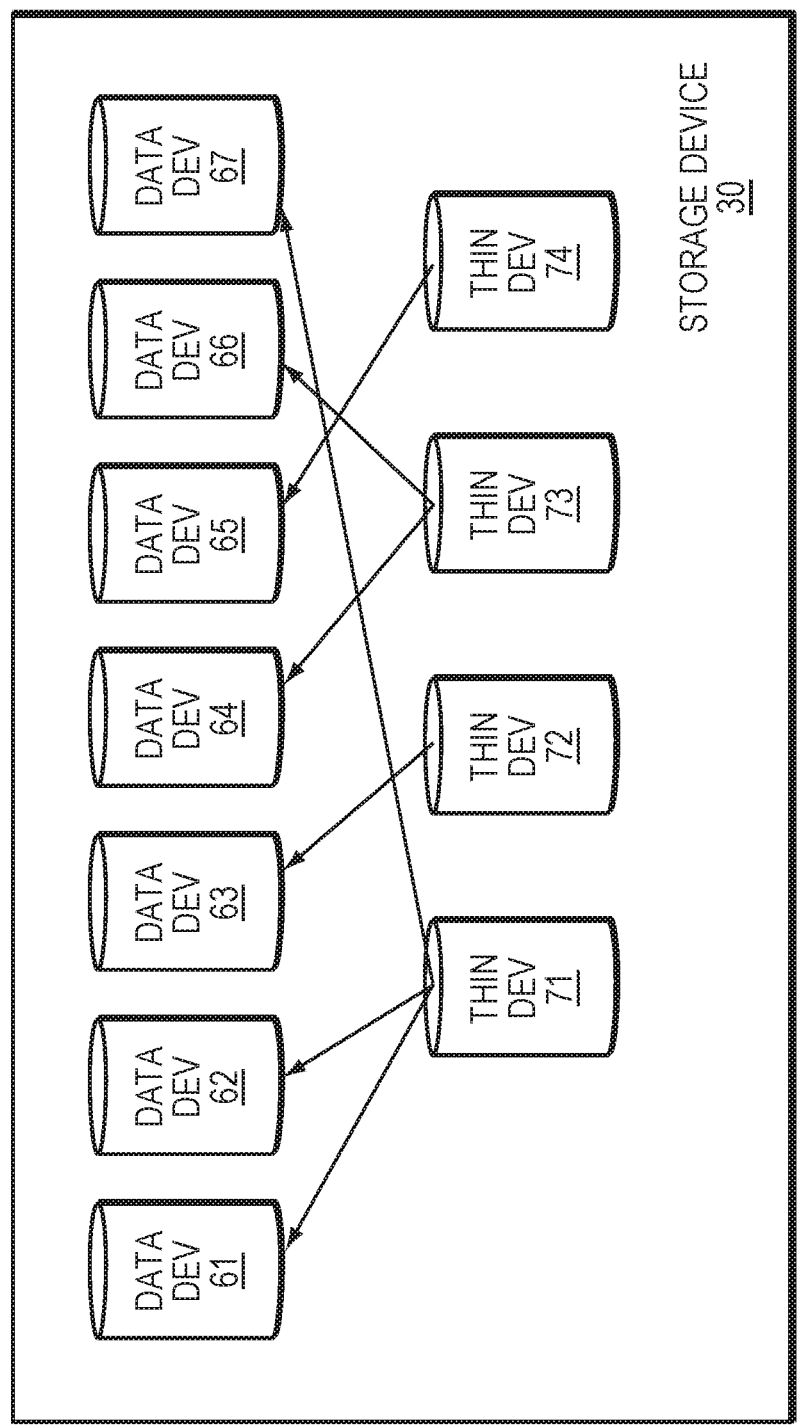
FIG. 4 is a schematic of an exemplary data storage device according to embodiments herein.

FIG. 4 is a schematic diagram showing the storage device 30 (see FIG. 3) as including a plurality of data devices 61-67. Data devices 61-67 may be implemented as logical devices like standard logical devices provided in a Symmetrix data storage device. In some embodiments, the data devices 61-67 may not be directly useable (visible) to hosts coupled to the storage device 30, shown in FIG. 3. Each of the data devices 61-67 may correspond to a portion (including a whole portion) of one or more of the disk drives 42-44, shown in FIG. 3. Thus, for example, the data device 61 may correspond to the disk drive 42 (FIG. 3), may correspond to a portion of the disk drive 42 (FIG. 3), or may correspond to a portion of the disk drive 42 (FIG. 3) and a portion of the disk drive 43 (FIG. 3). The data devices 61-67 may be designated as corresponding to different classes, so that different ones of the data devices 61-67 correspond to different physical storage having different relative access speeds or RAID protection type (or some other relevant distinguishing characteristic or combination of characteristics), as further discussed elsewhere herein.

The storage device 30 may also include one or more thin devices 71-74. Each of the thin devices 71-74 may appear to a host coupled to the storage device 30 as a logical volume (logical device) containing a contiguous block, or extent, of data storage. Each of the thin devices 71-74 may contain tables that point to some or all of the data devices 61-67 (or portions thereof), as further discussed elsewhere herein. Historically, the thin devices 71-74 could be concatenated to form a metavolume of thin devices. In more recent designs of storage device 30, we use Online Device Expansion as a means of allowing individual thin devices 71-74 to expand capacity. In other embodiments, only one thin device may be associated with the same data device while, in other embodiments, multiple thin devices may be associated with the same data device.

In some embodiments, it may be possible to implement the system described herein using storage areas, instead of storage devices. Thus, for example, the thin devices 71-74 may be thin storage areas, data devices 61-67 may be standard logical areas, and so forth. In some instances, such an implementation may allow for hybrid logical devices where a single logical device has portions that behave as a data device and/or portions that behave as a thin device. Accordingly, it should be understood that, in appropriate instances, references to devices in the discussion herein may also apply to storage areas that may or may not correspond directly with a storage device.

Many modern disk arrays allow existing Logical Unit Numbers (LUN) to be resized. One example is Veritas Volume Manager (VxVM), which supports dynamic LUN expansion, by providing a facility to update disk headers and other VxVM structures to match a new LUN size. Typically, the device to be expanded can have a SCSI interface, which is presented by a smart switch, smart array, or RAID controller.

Resizing is typically performed on LUNs that preserve data, as opposed to LUNs containing ephemeral data. Resizing typically only affects storage at the end of the LUN, as opposed to data at the beginning of the LUN. In a resizing operation using VxVM, no attempt is made to verify the validity of pre-existing data on the LUN. The resizing operation is typically performed on a host where the disk group is imported, or on the master node for a cluster-shared disk group. In this situation, remote replication would be disabled during the resizing operation. In order to overcome the disadvantages attendant to disabling remote replication, we refer to FIG. 5, which is a flow chart showing the steps of method embodiments herein.

Methods disclosed herein can be used in data storage system embodiments as discussed above with reference to FIGS. 1-4. Those of skill in the art will recognize that variations within the architectural details associated with system embodiments are not intended to affect the scope of the claims.

Figure 5:
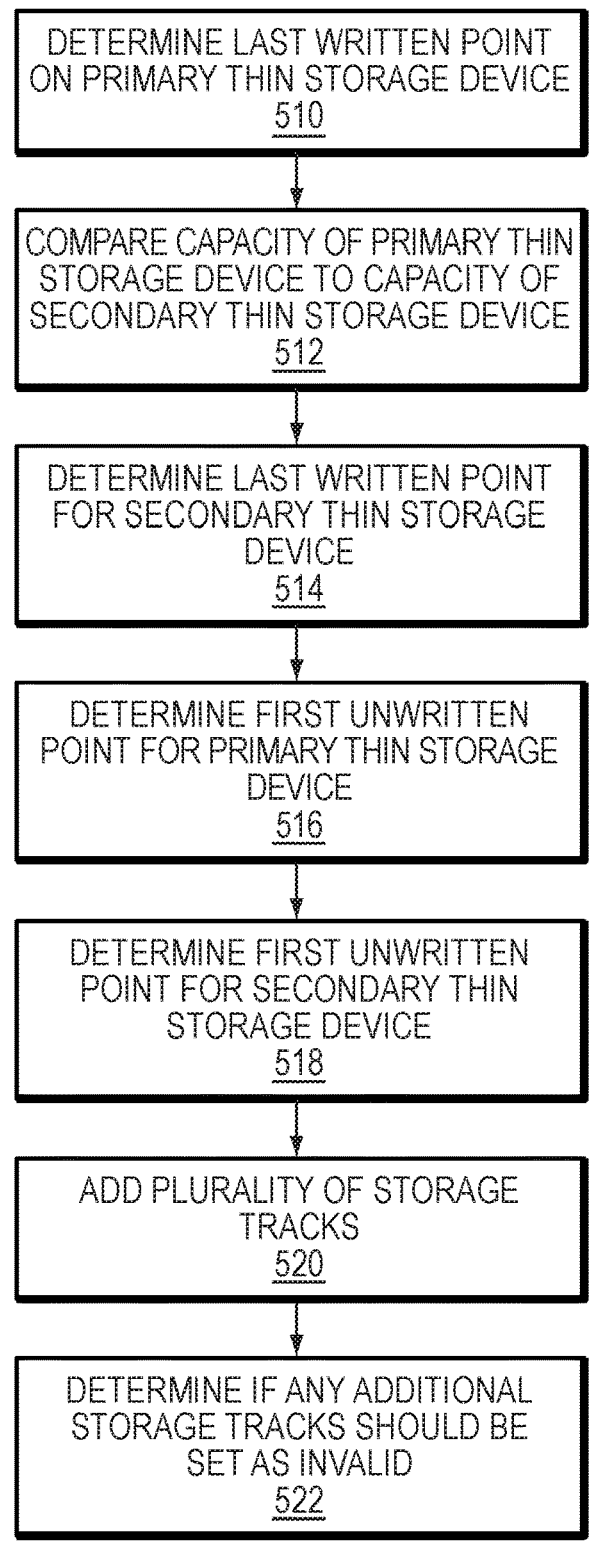
FIG. 5 is a flow chart showing method steps for embodiments disclosed herein.

FIG. 5 depicts a flow chart showing a method for performing on online data expansion in a data storage system having remote replication capabilities. The data storage system could be comprised of a memory, a primary thin storage device communicatively coupled to a secondary thin storage device. In addition, the data storage system could include a processor. Computer executable instructions could be stored on the processor or in the memory. In order to begin the online data expansion, we determine 512 a last written point on the primary thin storage device by setting the last written point to a last physical cylinder and a last physical head location of the primary thin storage device.

Figure 6:
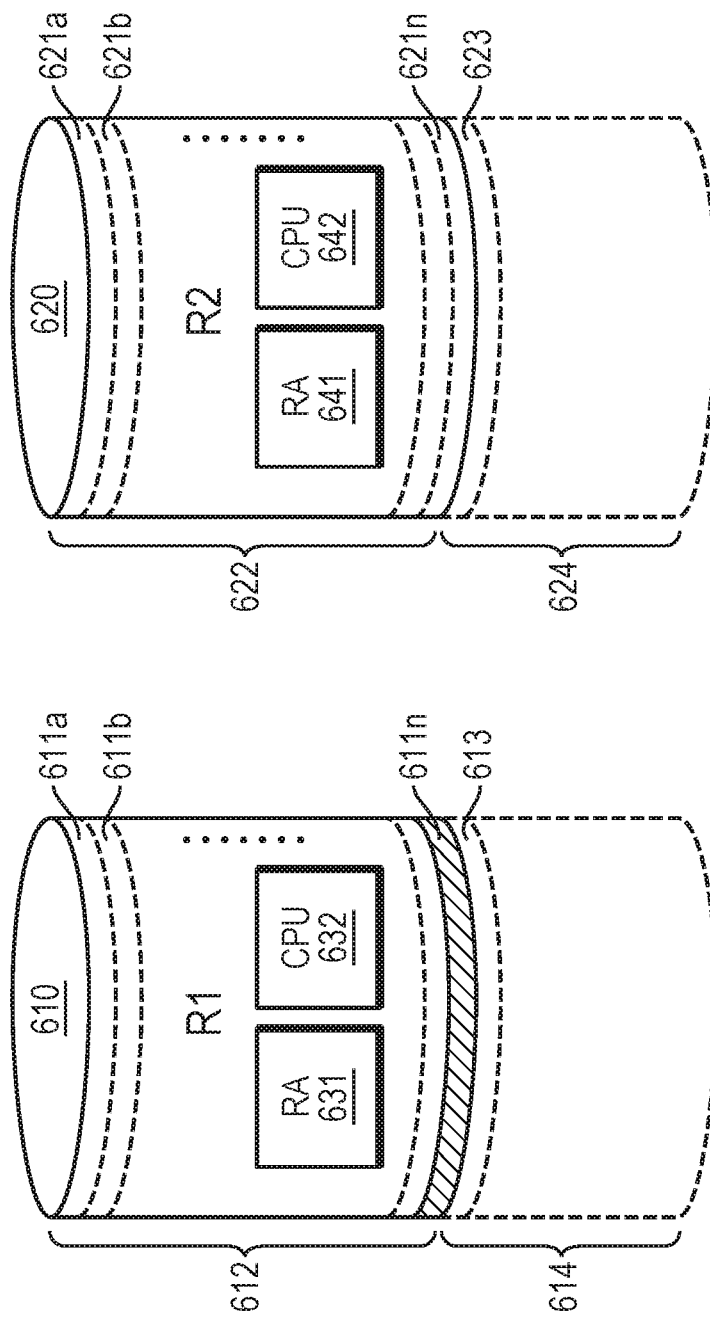
FIG. 6 is a high-level block diagram of a system architecture for use with embodiments disclosed herein.

For illustrative purposes, we show FIG. 6, which is an illustration of a portion of the data storage system according to embodiments. Specifically, FIG. 6 shows primary thin storage device (interchangeably referred to as "R1") 610 and secondary thin storage device (interchangeably referred to as "R2") 620. Primary storage thin storage device 610 contains storage tracks 611a, 611b . . . 611n. Similarly, secondary thin storage device 620 contains tracks 621a, 621b . . . 621n. Note, the terms "track," "cylinder," and "head" are derived from mainframe storage systems. Those of skill in the art will recognize their continued use for historical purposes in non-mainframe storage systems. Accordingly, these terms should not be construed to be limited to mainframe storage systems.

In this embodiment, R1 610 and R2 620 are communicatively coupled via a remote replication communication protocol. Remote replication is frequently used in data storage systems requiring redundancy. Some examples of these types of systems can be disaster recovery systems, financial institutions, medical institutions, and just about any business or individual that collects and stores data.

Online data expansion allows a data storage device, such as R1 610 or R2 620, to expand capacity seamlessly without requiring the data storage device to go offline during expansion. When a data storage device is autonomous, it is easier to achieve online data expansion. In the situation when two or more data storage devices are coupled using remote replication, however, online data expansion is not seamless enabled because the two storage devices, i.e., the primary thin storage device 610 and the secondary thin storage device 620, must be synchronized in terms of the data appearing in each. In terms of achieving this mirroring between the two devices, R1 610 and R2 620 can be connected via a synchronous connection or an asynchronous connection.

Referring to FIGS. 5 and 6, determining 510 the last written point on the primary thin storage device 610 can be done by setting the last written point to a last physical cylinder and a last physical head location in the final track 611n of the primary thin storage device 610. Next, we compare 512 a capacity 612 of the primary thin storage device 610 to a capacity 622 of the secondary thin storage device 622. This comparison 512 will result in either the two thin storage devices 610 and 620 having an equal capacity, or one or the other of the thin storage devices 610 and 620 being larger than the other. These differing results, which affects determining the first unwritten point 623, are discussed in more detail below.

From there, we determine 514 a last written point 621n for the secondary thin storage device 620 based on the comparison 512 of the capacity 612 of the primary thin storage device 610 to the capacity 622 of the secondary thin storage device 620. Next we determine 516 a first unwritten point 613 for the primary thin storage device 610 using the last written point 611n for the primary thin storage device 610. The first unwritten point 613 is the last written point 611n plus one track or one block. Similarly, we determine 516 a first unwritten point 623 for the secondary thin storage device 620 using the last written point 621n for the secondary thin storage device. In embodiments, determining the first unwritten point 623 will be based in part on the capacity of the first thin storage device 610 as compared with the second thin storage device 620. In addition, determining the first unwritten point 623 can also be affected by whether or not the second thin storage device is read/write enabled. If the second thin storage device 620 is read/write enabled, RA 641 will use processor 642 to set the first unwritten point 623 to the size of the second thin storage device 620.

Once these steps are performed, we add 520 a plurality of tracks 614, 624 to either the primary thin storage device 610 or the secondary thin storage device 620, respectively. Finally, we determine 522 if any of the plurality of additional tracks 614, 624 should be set as invalid by comparing a value of the first unwritten point 613 for the primary thin storage device 610 to a value for the first unwritten point 623 for the secondary thin storage device 620.

If the value of the first unwritten point 613 on the primary thin storage device 610 is equal to the value of the first unwritten point 623 on the secondary thin storage device 620, there is no need to set any of the additional tracks 614 to invalid before they are copied to the secondary thin storage device 620. If, on the other hand, the value of the first unwritten point 613 on the primary thin storage device 610 is less than the value of the first unwritten point 623 on the secondary thin storage device 620 before online data expansion, it is desirable to set some tracks as invalid on the newly added tracks 614. Specifically, the tracks ranging from the first unwritten point 623 on the secondary thin storage device 620 to those of the first unwritten point 613 on the primary thin storage device 610 should be set as invalid on the primary thin storage device 610.

By way of example, if the primary thin storage device 610 contained 1000 tracks before expansion and the secondary thin storage device 620 also contained 1000 tracks before expansion, no additional tracks 614 would be set to invalid upon expansion. Alternatively, the secondary thin storage device 620 had 1500 tracks. And the primary thin storage device 610 had 1000 tracks, it would be necessary to set invalid tracks in the primary thin storage device 610 before online data expansion could be accomplished. In this instance, remote replication, also called disaster recovery, would be lost during the time that the newly added tracks 614 are being copied from the primary thin storage device 610 to the secondary thin storage device 620.

Although we show a single primary thin storage device 610 having a remote replication relationship with a single secondary thin storage device 620, in alternate embodiments, a primary thin storage device 610 could have a remote replication with more than one secondary thin storage device (not shown). In alternate embodiments, secondary thin storage device 620 could be a secondary device with respect to primary thin storage device 610; and could itself be a primary device for an additional secondary thin storage device (not shown). Those of skill in the art will recognize that there are myriad possible storage configurations that are capable of employing the teachings herein.

With respect to system embodiments, the method steps previously discussed can be achieved with the architecture shown in FIG. 6. Specifically, RA director 631 can use processor 632, which could be within the primary thin storage device 610 or coupled thereto, to set the first unwritten point 613. RA director 631 can send the first unwritten point 613 information to a second RA director 641 associated with the second thin storage device 620. The processor 642, which could be internal or external, will then set the first unwritten point 623. RA 641 will then compare first unwritten point 613 with first unwritten point 623. In alternate embodiments, RA 631 could compare first unwritten point 613 with first unwritten point 623.

In addition, RA 631 will compare first unwritten point 613 with first unwritten point 623 in order to determine if any additional tracks 614 should be set as invalid as described above. In alternate embodiments, RA 631 or RA 641 could determine whether any additional tracks 614, 624 should be set as null tracks. In some embodiments, RA 631 and RA 641 could be combined into a single device. Similarly, processor 632 and processor 642 could likewise be combined into a single device.

In alternate embodiments, it is possible to suspend the remote replication relationship between thin storage devices 610, 620 and allow hosts to write directly to a secondary thin storage device 620, as opposed to data arriving at a secondary storage device 620 from a primary storage device 610. In this embodiment, the secondary storage device's last written point 621 could be determined as previously described with respect to the determining the last written point 611 for the primary storage device 610. If the secondary storage device 620 is the same size as the primary storage device 610, there would be no change in establishing the last written point 621 on the secondary storage device 620. If, however, the secondary storage device 620 is larger than the primary storage device 610, its last written point 621 would increase. In this embodiment, when remote replication resumes, the secondary storage device's 620 last written point 621 would not decrease. Therefore, when the primary storage device's storage 610 capacity expands, the newly expanded tracks 614 could be marked as invalid.

In some embodiments, it is possible for the first unwritten point 613, 623 and the last written point 611, 621 to not be aligned with a track boundary. To illustrate this embodiment, we show a comparison between the situation when the first unwritten point 613, 623 and the last written point 611, 621 are aligned with a track boundary and the situation when they are not aligned on a track boundary.

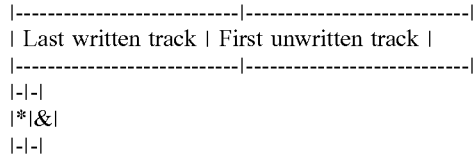

Where "*" is the last written point 611, 621 and "&" is the first unwritten point 613, 623.

Below is an example of a situation where the boundary between the last written block 611, 621 and the first unwritten block 613, 623 could, in theory, not be aligned to a track boundary:

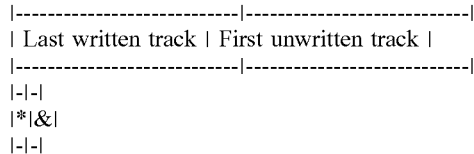

In this case, the following relationships still hold: (1) for any relevant unit, the first unwritten point 613, 623 is one more than the last written point 611, 621; and (2) for any two units A and B, where B is larger than A, the last written A is entirely within the last written B. (If the boundary between units B doesn't fall on the boundary between units A—a unit hierarchy which probably isn't useful—then the last written A could be split between the last written B and the previous B.) Continuing on the theme of caring about the boundary between the two, the different boundary seen with the larger unit is because it is better to believe that data that has not been written to may have been written to than it is to believe the opposite.

Throughout the entirety of the present disclosure, use of the articles "a" or "an" to modify a noun may be understood to be used for convenience and to include one, or more than one of the modified noun, unless otherwise specifically stated.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Various changes and modifications of the embodiments shown in the drawings and described in the specification may be made within the spirit and scope of the present invention. Accordingly, it is intended that all matter contained in the above description and shown in the accompanying drawings be interpreted in an illustrative and not in a limiting sense. The invention is limited only as defined in the following claims and the equivalents thereto.

What is claimed is:

1. For a data storage system including a memory and at least a primary thin storage device and a secondary thin storage device, the storage devices being logically divided, either explicitly or implicitly, into a plurality of tracks, wherein the primary and secondary storage devices are communicatively coupled using a remote replication communication protocol, a method comprising:
   a. determining a last written point on the primary thin storage device by setting the last written point to a last physical cylinder location and a last physical head location of the primary thin storage device;
   b. comparing a capacity of the primary thin storage device to a capacity of the secondary thin storage device;
   c. determining a last written point for the secondary thin storage device based on the comparison of the capacity of the primary thin storage device to the capacity of the secondary thin storage device;
   d. determining a first unwritten point for the primary thin storage device using the last written point for the primary thin storage device;
   e. determining a first unwritten point for the secondary thin storage device using the last written point for the secondary thin storage device;
   f. adding at least one additional storage track to the primary thin storage device or the secondary thin storage device; and
   g. determining if any of the additional storage tracks should be set as an invalid track by comparing a value of the first unwritten point for the primary thin storage device to a value for the first unwritten point for the secondary thin storage device.

2. The method of claim 1 wherein the additional storage tracks contain at least one null track.

3. The method of claim 1 wherein determining the last unwritten point for the secondary thin storage device further comprises setting the last unwritten point for the secondary thin storage device to a same value as the last unwritten point for the primary thin storage device if the capacity of the primary thin storage device is equal to the capacity of the secondary thin storage device.

4. The method of claim 1 wherein determining the last unwritten point for the secondary thin storage device further comprises setting the last written point for the secondary thin storage device to a last physical cylinder and a last physical head location of the secondary thin storage device if the capacity of the secondary thin storage device is greater than the capacity of the primary thin storage device.

5. The method of claim 1 wherein determining the last unwritten point for the secondary thin storage device further comprises setting the last unwritten point for the secondary thin storage device the greater of a same value as the last unwritten point for the primary thin storage device or a last physical cylinder and a last physical head location of the secondary thin storage device if the capacity of the secondary thin storage device if the secondary thin storage device has been enabled to have a read and write capability.

6. The method of claim 1 further comprising marking a plurality of newly added tracks as invalid if the value of the secondary first unwritten point is greater than the value of the primary first unwritten point but less than a value of a last newly added track on the secondary thin storage device.

7. The method of claim 1 wherein the remote replication communication protocol is temporarily suspend such that a host can write directly to the secondary thin storage device further comprising:
 a. expanding the capacity of the secondary thin storage device by treating the secondary storage device as though it were the primary storage device; and
 b. expanding the capacity of the primary thin storage device once the remote replication communication protocol is restored by treating the primary thin storage device as though it were the secondary storage device.

8. A system comprising:
 a. a primary thin storage device;
 b. a secondary thin storage device, the thin storage devices being logically divided, either explicitly or implicitly, into a plurality of tracks, wherein the primary and secondary thin storage devices are communicatively coupled using a remote replication communication protocol;
 c. one or more processors;
 d. one or more remote data facility (RDF) adapters;
 e. a memory comprising code stored thereon that, when executed, performs a method comprising:
  i. determining a last written point on the primary thin storage device by setting the last written point to a last physical cylinder location and a last physical head location of the primary thin storage device;
  ii. comparing a capacity of the primary thin storage device to a capacity of the secondary thin storage device;
  iii. determining a last written point for the secondary thin storage device based on the comparison of the capacity of the primary thin storage device to the capacity of the secondary thin storage device;
  iv. determining a first unwritten point for the primary thin storage device using the last written point for the primary thin storage device;
  v. determining a first unwritten point for the secondary thin storage device using the last written point for the secondary thin storage device;
  vi. adding at least one additional storage track to the primary thin storage device or the secondary thin storage device; and
  vii. determining if any of the additional storage tracks should be set as an invalid track by comparing a value of the first unwritten point for the primary thin storage device to a value for the first unwritten point for the secondary thin storage device.

9. The system of claim 8 wherein the additional storage tracks contain at least one null track.

10. The system of claim 8 wherein determining the last unwritten point for the secondary thin storage device further comprises setting the last unwritten point for the secondary thin storage device to a same value as the last unwritten point for the primary thin storage device if the capacity of the primary thin storage device is equal to the capacity of the secondary thin storage device.

11. The system of claim 8 wherein determining the last unwritten point for the secondary thin storage device further comprises setting the last written point for the secondary thin storage device to a last physical cylinder and a last physical head location of the secondary thin storage device if the capacity of the secondary thin storage device is greater than the capacity of the primary thin storage device.

12. The system of claim 8 wherein determining the last unwritten point for the secondary thin storage device further comprises setting the last unwritten point for the secondary thin storage device the greater of a same value as the last unwritten point for the primary thin storage device or a last physical cylinder and a last physical head location of the secondary thin storage device if the capacity of the secondary thin storage device if the secondary thin storage device has been enabled to have a read and write capability.

13. The system of claim 8 further comprising marking a plurality of newly added tracks as invalid if the value of the secondary first unwritten point is greater than the value of the primary first unwritten point but less than a value of a last newly added track on the secondary thin storage device.

14. The system of claim 8 wherein the remote replication communication protocol is temporarily suspend such that a host can write directly to the secondary thin storage device further comprising:
 a. expanding the capacity of the secondary thin storage device by treating the secondary storage device as though it were the primary storage device; and
 b. expanding the capacity of the primary thin storage device once the remote replication communication protocol is restored by treating the primary thin storage device as though it were the secondary storage device.

15. A computer program product to expand data storage capacity, the computer program product being embodied in a tangible, non-transitory computer readable storage medium and comprising computer instructions for:
 a. determining a last written point on the primary thin storage device by setting the last written point to a last physical cylinder location and a last physical head location of the primary thin storage device;
 b. comparing a capacity of the primary thin storage device to a capacity of the secondary thin storage device;
 c. determining a last written point for the secondary thin storage device based on the comparison of the capacity of the primary thin storage device to the capacity of the secondary thin storage device;
 d. determining a first unwritten point for the primary thin storage device using the last written point for the primary thin storage device;
 e. determining a first unwritten point for the secondary thin storage device using the last written point for the secondary thin storage device;
 f. adding at least one additional storage track to the primary thin storage device or the secondary thin storage device; and
 g. determining if any of the additional storage tracks should be set as an invalid track by comparing a value of the first unwritten point for the primary thin storage device to a value for the first unwritten point for the secondary thin storage device.

16. The computer program product of claim 13 wherein the additional storage tracks contain at least one null track.

17. The computer program product of claim 13 wherein determining the last unwritten point for the secondary thin storage device further comprises setting the last unwritten point for the secondary thin storage device to a same value as the last unwritten point for the primary thin storage device if the capacity of the primary thin storage device is equal to the capacity of the secondary thin storage device.

18. The computer program product of claim 13 wherein determining the last unwritten point for the secondary thin storage device further comprises setting the last written point for the secondary thin storage device to a last physical cylinder and a last physical head location of the secondary thin storage device if the capacity of the secondary thin storage device is greater than the capacity of the primary thin storage device.

19. The computer program product of claim 13 wherein determining the last unwritten point for the secondary thin storage device further comprises setting the last unwritten point for the secondary thin storage device the greater of a same value as the last unwritten point for the primary thin storage device or a last physical cylinder and a last physical head location of the secondary thin storage device if the capacity of the secondary thin storage device if the secondary thin storage device has been enabled to have a read and write capability.

20. The computer program product of claim 13 further comprising marking a plurality of newly added tracks as invalid if the value of the secondary first unwritten point is greater than the value of the primary first unwritten point but less than a value of a last newly added track on the secondary thin storage device.

* * * * *